G. H. BARSCHOW.
METAL WHEEL.
APPLICATION FILED FEB. 17, 1909.
929,650.
Patented Aug. 3, 1909.
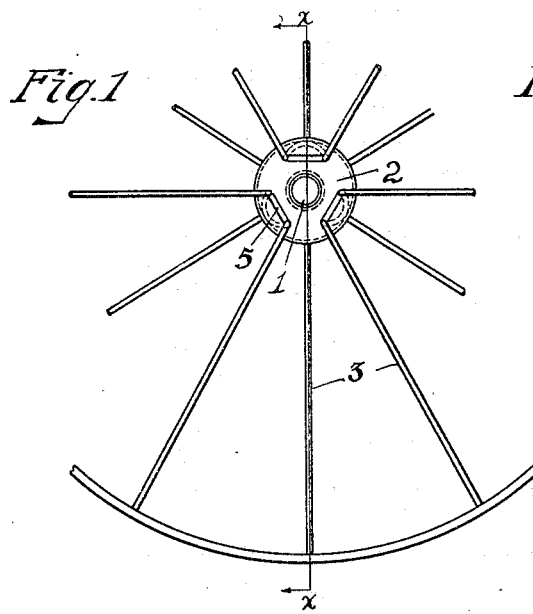
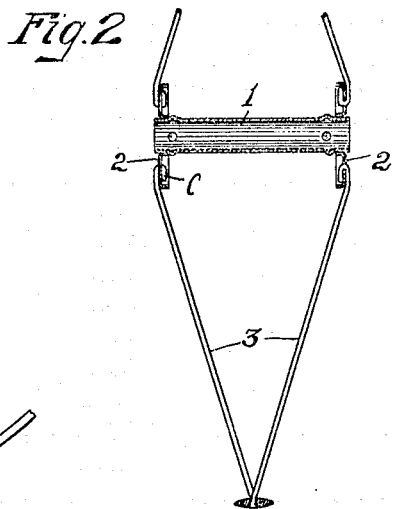
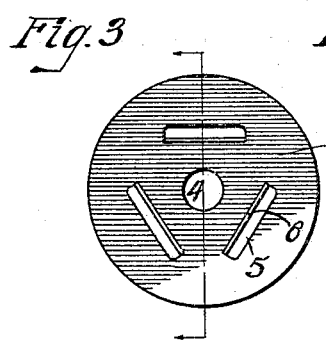
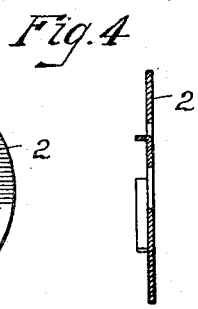
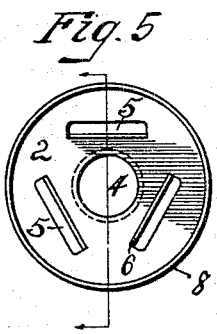
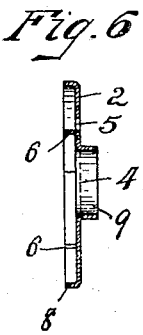
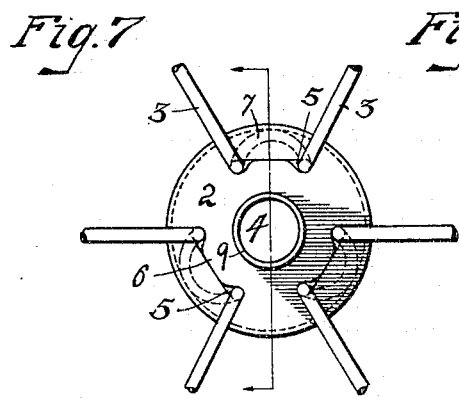
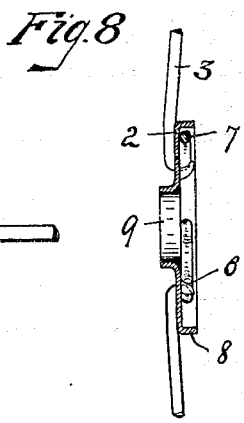
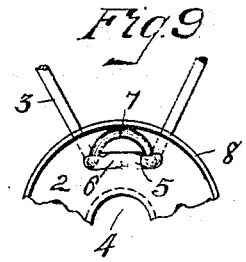
WITNESSES.
Hazel B. Hiett
Eugene Schreiber
INVENTOR.
George H. Barschow,
By Owen & Owen
His attys.

UNITED STATES PATENT OFFICE.

GEORGE H. BARSCHOW, OF TOLEDO, OHIO, ASSIGNOR TO THE AMERICAN METAL WHEEL AND AUTO COMPANY, OF TOLEDO, OHIO, A CORPORATION OF OHIO.

METAL WHEEL.

No. 929,650.        Specification of Letters Patent.        Patented Aug. 3, 1909.

Application filed February 17, 1909. Serial No. 478,499.

*To all whom it may concern:*

Be it known that I, GEORGE H. BARSCHOW, a citizen of the United States, and a resident of Toledo, in the county of Lucas and State of Ohio, have invented a certain new and useful Metal Wheel; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to metal wheels, and more particularly to the construction of the hub and the means of securing the inner ends of the spokes thereto.

The object of my invention is to provide a metal wheel of simple, cheap and durable construction, and that combines a maximum of strength with a minimum number of parts.

The invention is fully described in the following specification, and illustrated in the accompanying drawings, in which,—

Figure 1 is a side elevation of a portion of a wheel embodying one form of my invention. Fig. 2 is a cross-section on the line *x x* in Fig. 1. Figs. 3 and 4 are enlarged face and sectional views, respectively, of a preferred form of a hub flange or disk as it appears after the first forming operation. Figs. 5 and 6 are similar views of the same after the second operation. Figs. 7 and 8 are similar views of the same with the spokes attached thereto, and Fig. 9 is a view of the reverse side of a portion of the flange or disk to that shown in Fig. 7.

Referring to the drawings, 1 designates the usual cylindrical hub body, at the end portions of which are provided or secured the spoke attaching flanges or disks 2 from which the spokes 3 radiate. The flanges 2 are provided around the hub-body receiving openings 4 thereof with a series of slots 5, from the inner sides of which preferably project the lips 6, which are the strips of metal struck from the disks to provide such slots. These slots are so arranged relative to the disk openings 4 that their ends are substantially equidistantly spaced from the hub axis, as shown. The spokes 3 are formed in pairs, two spokes being formed from a single piece of wire, which is bent to provide a connecting loop 7 at the inner ends thereof, and this looped end is in turn bent in hook-shape, to adapt it to hook within a slot 5 of a disk or spoke attaching flange 2, as shown. The hooked end of a pair of connected spokes having been engaged with a slot 5, the portions thereof disposed on opposite sides of the disk are pressed closely to such opposing sides and the lip 6 pressed over to bear against the wire at its two points of emergence from the slot, whereby to hold the wire to its seats at the slot ends, and to substantially fill the remaining open portion of the slot, as shown in Figs. 7, 8 and 9. It is apparent that this forms a very rigid and secure means of attaching the spokes to the wheel hub, and one that will not loosen by the application of lateral or longitudinal stresses on the spokes.

While it is preferable to employ the lips 6 to lock the spokes within the slots it is not necessary, as the metal may be cut entirely away in forming the slots and the pairs of spokes engaged with the slots by simply inserting their hooked ends therein, as shown in Figs. 1 and 2.

A circumferential flange 8 is preferably formed upon the disk 2 in the same direction as the lips 6 to provide a protection for the loops 7 of the spokes and to give the disk a finished appearance, and an annular bearing flange 9 is preferably formed centrally of the disk for engaging with the body portion 1 of the hub.

I wish it understood that my invention is not limited to any specific construction, arrangement or manner of forming the parts, except in so far as such limitations are specified in the claims.

Having thus described my invention, what I claim as new and desire to secure Letters Patent, is,—

1. The combination of a hub-flange having a slot at an angle to an intersecting radius thereof, and a pair of spokes in looped connection at their inner ends and having such looped end in hooked engagement with the wall of the slot.

2. A wheel having its hub flanges provided with a plurality of slots, and its spokes connected at their inner ends in pairs with the connected ends of each pair projected through a single slot and coöperating with the outer wall thereof to secure the pair of spokes to the flange.

3. In a wheel, the combination of a hub-flange having a series of openings which are elongated transversely of intersecting radii, and a series of spokes arranged in pairs, each of which pairs has its inner spoke ends connected and such connected ends projected through one of said openings and bent outwardly against the flange.

4. In a wheel, the combination of a hub-flange having a series of slots therein, and a series of spokes, said spokes being arranged in pairs and each pair formed of a single piece of wire bent to form a connecting loop at the inner ends of the spokes, and such looped portion hooked within one of said slots and pressed closely to the face of the flange.

5. In a wheel, the combination of a hub-flange having a series of slots, the ends of which are substantially equidistantly spaced from the hub axis, and a series of spokes arranged in pairs with the inner ends of the spokes of each pair in loop connection, such looped ends being inserted through a registering slot and pressed outwardly against the contiguous face of the flange.

6. In a wheel, the combination of a hub having its spoke-attaching flanges provided with a series of slots, a series of spokes arranged in pairs, each of which pairs is formed of a single length of wire and has its spokes in loop connection at their inner ends, said loop being in hooked engagement with a flange slot, and means for rigidly securing the spokes within said slots.

7. In a wheel, the combination of a hub-flange having a slot therein, a pair of spokes in loop connection at their inner ends and having such looped end in hooked engagement with said slot, and a part integral with the flange and in engagement with the looped end portion of the spokes to rigidly secure them within the slot.

8. In a wheel, the combination of a hub-flange having lips struck therefrom to form slots in the flange and a series of spokes arranged in pairs, the spokes of each pair being formed from a single piece of wire and in looped connection at their inner ends, such looped ends being inserted through said slots and pressed against the contiguous face of the flange and secured against movement relative to the flange by an engaging of the flange-lips therewith.

9. The combination of a hub-flange having a series of slots provided therein, a series of spokes arranged in pairs, each pair of spokes being formed of a single piece of wire with their inner ends in looped connection, said looped ends of the pairs of spokes being inserted through said slots and bent whereby opposing portions of the spoke-wire bear against the opposite faces of the flange, and lips integral with the flanges and bent to engage the inner end portions of the pairs of spokes to hold them rigidly to their seats in the slots and to substantially fill the portions of the slots not filled by the spokes.

In testimony whereof I have hereunto signed my name to this specification in the presence of two subscribing witnesses.

GEORGE H. BARSCHOW.

Witnesses:
C. W. OWEN,
HAZEL B. HIETT.